United States Patent [19]
Yoo et al.

[11] Patent Number: 5,678,416
[45] Date of Patent: Oct. 21, 1997

[54] METHODS AND APPARATUS FOR CONTROLLING A REFRIGERATOR IN NORMAL AND OVERLOAD MODES

[75] Inventors: Han-Ju Yoo, Kwangmyeong; Jae-Seung Lee, Suwon; Kuk-Jeong Seo, Seoul, all of Rep. of Korea

[73] Assignee: Samsung Electronics Co., Ltd., Suwon, Rep. of Korea

[21] Appl. No.: 558,219

[22] Filed: Nov. 17, 1995

[30] Foreign Application Priority Data

Nov. 17, 1994 [KR] Rep. of Korea ............ 94-30324

[51] Int. Cl.⁶ ............................................. F25D 17/06
[52] U.S. Cl. ............................. 62/180; 62/131; 62/229
[58] Field of Search ................................ 62/131, 228.1, 62/208, 209, 203, 229, 180, 179

[56] References Cited

U.S. PATENT DOCUMENTS

| | | | |
|---|---|---|---|
| 5,224,355 | 7/1993 | So et al. | 62/229 |
| 5,255,530 | 10/1993 | Janke | 62/180 |
| 5,263,332 | 11/1993 | Park | 62/131 X |

*Primary Examiner*—Harry B. Tanner
*Attorney, Agent, or Firm*—Burns, Doane, Swecker & Mathis, L.L.P.

[57] ABSTRACT

A refrigerator has separate refrigerating and freezing compartments, an evaporator and fan for each compartment, and a compressor connected to the evaporators. A controller determines whether the refrigerator is in a normal mode or an overload mode, depending upon (i) the ambient temperature in the room where the refrigerator is disposed, (ii) the number of times the refrigerator door is opened per unit time, and (iii) the total time period in which the door is in an open state per unit time. In a normal mode, the compressor and both fans are operated simultaneously under the control of the temperature in the freezing compartment. In an overload mode, the two fans are operated independently, under the control of the respective temperatures in the freezing and refrigerating compartments.

7 Claims, 10 Drawing Sheets

METHODS AND APPARATUS FOR CONTROLLING A REFRIGERATOR IN NORMAL AND OVERLOAD MODES

BACKGROUND OF THE INVENTION

1. Field of the Invention

The present invention relates to an apparatus for and a method of controlling the internal freezing and refrigerating compartment temperatures when the refrigerator is in an overload state.

2. Description of the Prior Art

Figure 1:
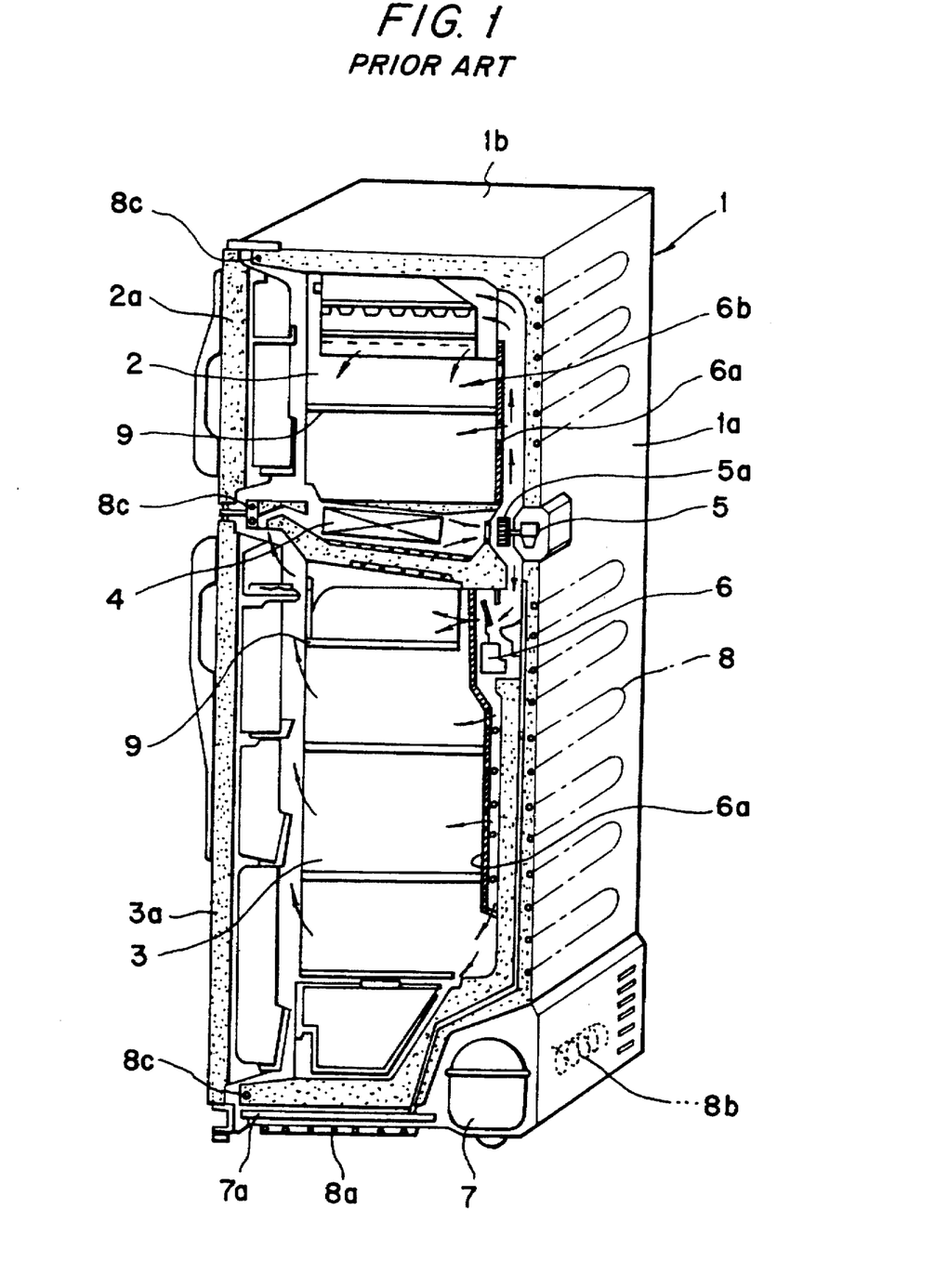
FIG. 1 is a partially-broken away perspective view illustrating a conventional refrigerator.

FIG. 1 illustrates a refrigerator having a conventional construction. As shown in FIG. 1, the refrigerator includes a refrigerator body 1 provided with a freezing compartment 2 and a refrigerating compartment 3. At the front portion of the refrigerator body 1, doors 2a and 3a are mounted which serve to open and close the freezing and refrigerating compartments 2 and 3, respectively.

Beneath the freezing compartment 2, an evaporator 4 is mounted which carries out a heat exchange between air being blown into the freezing and refrigerating compartments 2 and 3 and refrigerant passing through the evaporator 4, thereby evaporating the refrigerant by latent heat from the air while cooling the air. In the vicinity of the evaporator 4, a fan 5a is mounted which is rotated by a fan motor 5 to introduce the cold air heat-exchanged by the evaporator 4 into the freezing and refrigerating compartments 2 and 3.

In order to control the amount of cold air supplied to the refrigerating compartment 3, a damper thermistor 6 is provided which serves to sense the internal temperature of the refrigerating compartment 3. A plurality of shelves 9 are disposed in both the freezing and refrigerating compartments 2 and 3 to partition the compartments into several food storing sections.

At the rear portions of the freezing and refrigerating compartments 2 and 3, duct members 6a are mounted which respective flows of the cold air heat-exchanged by the evaporator 4 such that cold air enters and circulates through the freezing and refrigerating compartments 2 and 3. The freezing and refrigerating compartments 2 and 3 have cold air inlet ports 6b, respectively. Through the cold air discharge ports 6b, the cold air guided by the duct members 6a after being heat-exchanged by the evaporator 4 is introduced in the freezing and refrigerating compartments 2 and 3, respectively.

A compressor 7 is mounted at the lower portion of the refrigerator body 1 to compress the gaseous refrigerant of low temperature and pressure, emerging from the evaporator 4, to that of high temperature and pressure. An evaporating dish 7a is also provided which collects water (dewdrop) produced from the air being blown by the fan 5a upon cooling the air by the heat exchange at the evaporator 4 and water (defrost water) produced upon defrosting frost formed at the interior of the refrigerator and drains them out of the refrigerator.

A main condenser 8, which has a zig-zag tube shape, is arranged at a back frame plate 1a and both side walls of a cabinet 1b constituting the refrigerator body 1. Through the main condenser 8, the gaseous refrigerant of high temperature and pressure passes which has been compressed by the compressor 7. While passing through the main condenser 8, the gaseous refrigerant carries out a heat exchange with ambient air in accordance with the natural or forced convection, so that it is forcedly cooled to a liquid phase under low temperature and high pressure. An assistant condenser 8a is disposed beneath the evaporating dish 7a to evaporate water collected in the evaporating dish 7a.

At the lower portion of the refrigerator body 1, a capillary tube 8b is mounted. The capillary tube 8b serves to abruptly expand the liquid-phase refrigerant of low temperature and high pressure, which has been liquefied in the main condenser tube 8, thereby reducing the pressure of the refrigerant to an evaporation pressure. The refrigerant leaving the capillary tube has a fog phase under low temperature and pressure. Around the peripheral flange at the front wall of the refrigerator body 1, an anti-dewing pipe 8c is disposed to prevent the formation of dewdrops due to a temperature difference between the ambient warm air and the cold air existing in the refrigerator body 1.

Figure 2:
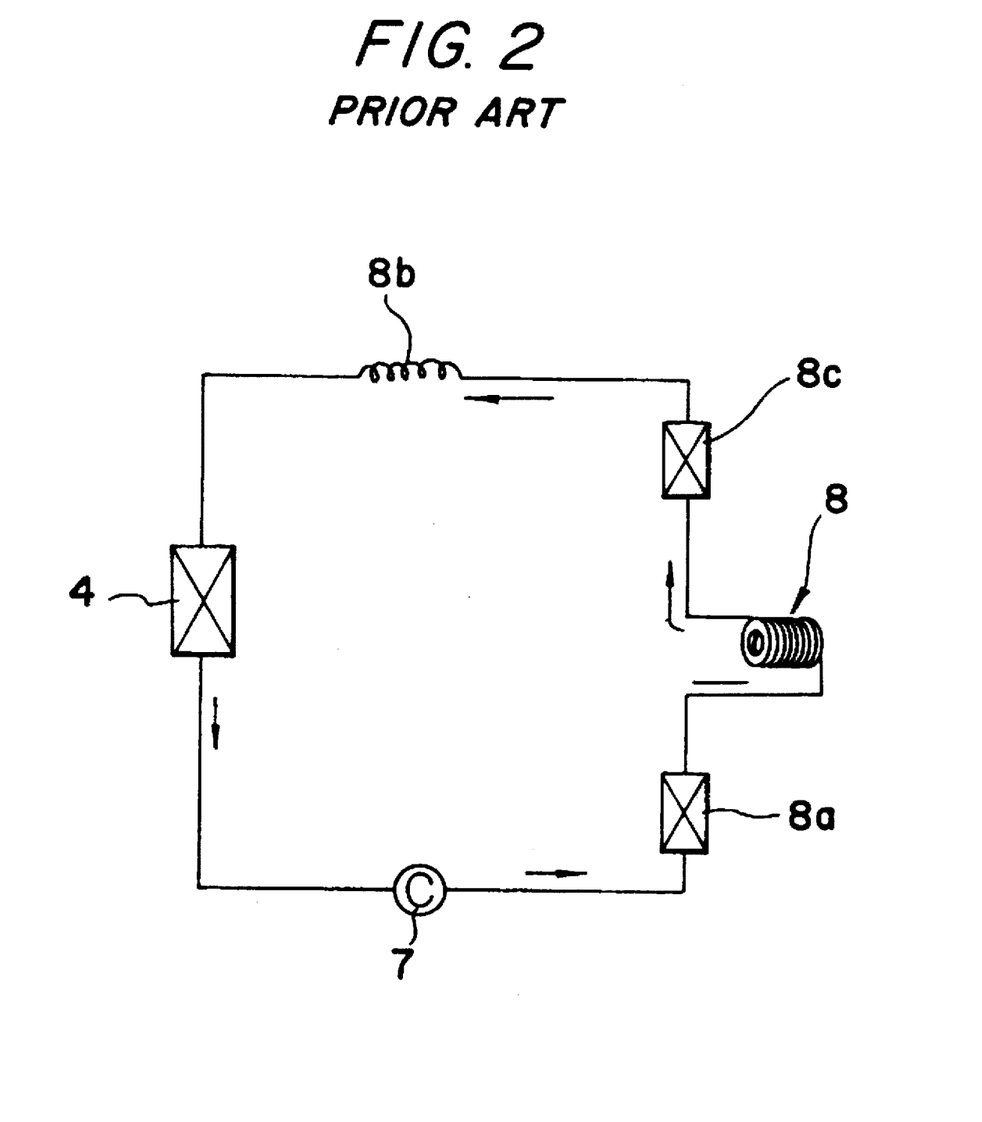
FIG. 2 is a circuit diagram illustrating a refrigerating cycle employed in the conventional refrigerator.

The conventional refrigerator having the above-mentioned arrangement constitutes a refrigerating cycle shown in FIG. 2.

To operate the refrigerator, a user manipulates a key switch (not shown) to set the desired internal temperatures of the freezing refrigerating compartments 2 and 3 and then powers the refrigerator to drive the fan motor 5 and compressor 7.

With the compressor 7 being driven, the refrigerant is compressed in a gaseous phase under high temperature and pressure. This refrigerant is then fed to the assistant condenser 8a. While passing through the assistant condenser 8a, the refrigerant evaporates water collected in the evaporating dish 7a. The refrigerant is then introduced in the main condenser 8. While passing through the main condenser 8, the refrigerant carries out a heat exchange with ambient air in accordance with natural or forced convection, so that it is cooled to a liquid phase under low temperature and high pressure.

The liquid-phase refrigerant of low temperature and high pressure, which has been liquefied in the main condenser tube 8, enters the anti-dewing pipe 8c. While passing through the anti-dewing pipe 8c, the refrigerant is changed to a phase with a more or less higher temperature of about 6° to 13° C. As a result, the generation of dewdrops in the refrigerator is prevented. The liquid-phase refrigerant of low temperature and high pressure then passes through the capillary tube 8b which serves to expand the refrigerant, thereby reducing its pressure to an evaporation pressure. In the capillary tube 8b, the refrigerant is changed to a fog phase under low temperature and pressure. The refrigerant emerging from the capillary tube 8b is then introduced in the evaporator 4.

While passing through the evaporator 4 which is constituted by a plurality of pipes, the fog-phase refrigerant of low temperature and pressure carries out a heat exchange with air being blown into the freezing and refrigerating compartments 2 and 3. By this heat exchange, the refrigerant is vaporized while cooling the air. The resultant gaseous refrigerant of low temperature and pressure emerging from the evaporator 4 is then introduced in the compressor 7. Thus, the refrigerant circulates the refrigerating cycle repeatedly, as shown in FIG. 2.

On the other hand, the cold air heat-exchanged with the refrigerant in the evaporator 4 is blown by a rotating force of the fan 5a and guided by the duct members 6a so that it is discharged into the freezing and refrigerating compartments 2 and 3 through the cold air discharge ports 6b.

After the cold air discharging operation is carried out for a certain period of time, the internal temperatures of the freezing and refrigerating compartments 2 and 3 are reduced to certain levels, respectively.

During the cold air discharging operation, the damper thermistor 6 arranged in the refrigerating compartment 3 senses the internal temperature of the refrigerating compartment 3 and controls the amount of cold air supplied to the refrigerating compartment 3 on the basis of the sensed internal temperature so that the internal temperature of the refrigerating compartment 3 can be maintained at an appropriate level.

In conventional refrigerators including a single evaporator and a single fan as in the above-mentioned arrangement, however, only the internal temperature of the freezing compartment is used to control the compressor for maintaining respective internal temperatures of freezing and refrigerating compartments at predetermined levels set by the user. That is, the internal temperature of the freezing compartment is sensed by a temperature sensor arranged in the freezing compartment 2. The sensed temperature is then compared with a predetermined temperature by control means to determine whether or not the sensed temperature is higher than the predetermined temperature.

When the internal temperature of the freezing compartment 2 is higher than the predetermined temperature, the compressor is driven under the control of the control means to decrease the internal temperature of the freezing compartment 2. On the other hand, when the internal temperature of the freezing compartment 2 is lower than the predetermined temperature, the driving of the compressor 7 is stopped under the control of the control means, whereafter the internal temperature of the freezing compartment 2 will increase. Thus, the compressor on/off control is used in the conventional refrigerators to maintain respective internal temperatures of freezing and refrigerating compartments at predetermined levels.

Since only the internal temperature of the freezing compartment is used to control the compressor, however, the conventional refrigerators involve various problems. For example, the internal temperature of the freezing compartment may be at a low level even when the internal temperature of the refrigerating compartment is abruptly increased over its predetermined level due to an increased number of times using the refrigerating compartment (namely, an increased number of times opening the refrigerating compartment door) or an increase in ambient temperature. In this case, the compressor is not driven. In this regard, it is difficult to maintain the internal temperature of the refrigerating compartment at an appropriate level. In this case, foods stored in the refrigerating compartment may be easily spoiled. Therefore, there is a degradation in reliability.

Other techniques relating to the control of refrigerators are disclosed in U.S. Pat. Nos. 5,243,837, 5,157,943, 5,150,583, 5,134,859 and 5,109678 and the Japanese Patent Laid-open Publication No. Heisei 4-169768. The Publication No. Heisei 4-169768 describes a temperature control for a refrigerator including a refrigerating cycle comprising an evaporator and a compressor, an electric fan adapted to feed cold air from the evaporator to freezing and refrigerating compartments, a temperature sensor adapted to detect the internal temperature of the refrigerator, and a control unit adapted to drive the compressor and electric fan in accordance with signals from the temperature sensor. The control means includes storing means for storing a control flow data determined experimentally to derive driving periods for the compressor and electric fan on the basis of the signal from the temperature sensor, and operating means for executing a fuzzy logic operation based on the control flow data stored in the storing means to operate the compressor and electric fan for a derived period.

In accordance with this technique, the temperature sensor detects the internal temperature of the refrigerator and sends the resultant signal to the control unit. Based on the signal, a microcomputer included in the control unit derives a deviation from a target value and a differential coefficient. The derived deviation and differential coefficient are used as an input value in the control flow for a fuzzy inference to derive an output value, namely, a control value for obtaining a target temperature. However, this method has a drawback because it is a temperature control method simply applying the fuzzy inference to the existing hardware. In other words, it is difficult for such a single refrigerating system to appropriately cope with different temperature variations respectively occurring in the freezing and refrigerating compartments. As a result, it is impossible to achieve uniform introduction and circulation of cold air, taking into consideration the fact that foods are stored in both the freezing and refrigerating compartments. Consequently, foods stored in the compartments may spoil.

SUMMARY OF THE INVENTION

Therefore, an object of the invention is to solve the above-mentioned problems and to provide an apparatus for and a method of controlling a refrigerator, being capable of constantly maintaining respective internal temperatures of freezing and refrigerating compartments by determining respective current operation conditions of the freezing and refrigerating compartments and driving the compressor and fan included in the refrigerator on the basis of the internal temperatures of the freezing and refrigerating compartments when the refrigerator is in an overload state, thereby preventing food stored in the refrigerating compartment from spoiling as well as satisfying the consumer's demand.

Another object of the invention is to provide an apparatus for and a method of controlling a refrigerator, being capable of rapidly controlling the internal temperature of the refrigerating compartment, when the refrigerator is in an overload state due to the frequent opening of its door, by driving the compressor and the refrigerating compartment fan in accordance with the internal temperature of the refrigerating compartment.

In accordance with one aspect, the present invention provides an apparatus for controlling a refrigerator, comprising: a storing chamber including a freezing compartment and a refrigerating compartment; a compressor adapted to compress a refrigerant; a pair of evaporators respectively adapted to receive the refrigerant from the compressor and to heat-exchange flows of air, being blown by a pair of fans, with the refrigerant, thereby cooling the air flows; the fans respectively arranged in the vicinity of the evaporators and adapted to supply the cold air flows to the freezing and refrigerating compartments; temperature sensing means adapted to sense respective internal temperatures of the freezing and refrigerating compartments; and control means adapted to drive the compressor and the fan for the refrigerating compartment, based on the internal temperature of the refrigerating compartment, when the refrigerator is determined as being in an overload state on the basis of the internal temperatures sensed by the temperature sensing means.

In accordance with another aspect, the present invention provides a method for controlling a refrigerator, comprising: a room temperature sensing step of sensing a temperature of a room where the refrigerator is installed; an overload determining step of accumulating the number of times a door of the refrigerator has been opened and a total door open time, and determining whether the refrigerator is in an overload state, on the basis of the accumulated number of door opening times, the accumulated total door open time and the room temperature sensed at the room temperature sensing step; an overload operation executing step of controlling a compressor, a freezing compartment fan and a refrigerating compartment fan all included in the refrigerator in accordance with internal temperatures of freezing and refrigerating compartments included in the refrigerator when the refrigerator is determined as being in the overload state at the overload determining step; and a normal operation executing step of controlling the compressor and the fans in accordance with the internal temperature of the freezing compartment when the refrigerator is determined as being in a normal state at the overload determining step.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 3:
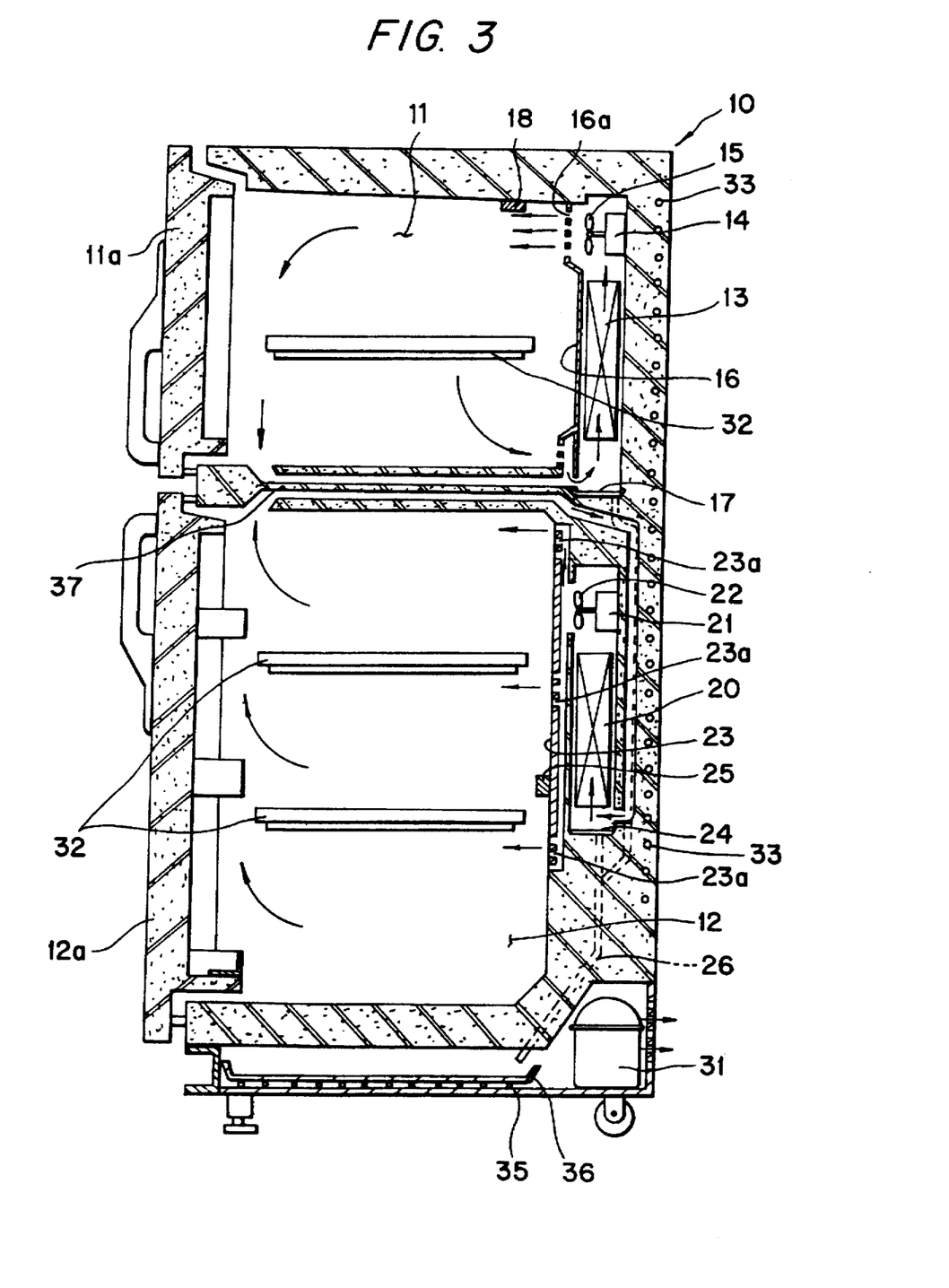
FIG. 3 is a vertical sectional view illustrating a refrigerator according to the present invention.

FIG. 3 illustrates a refrigerator according to the present invention. As shown in FIG. 3, the refrigerator includes a refrigerator body 10 which is vertically divided into two compartments, namely, a freezing compartment 11 and a refrigerating compartment 12 by an intermediate wall member 37. At the front portion of the refrigerator body 10, doors 11a and 12a are mounted which serve to open and close the freezing and refrigerating compartments 11 and 12, respectively.

The freezing and refrigerating compartments 11 and 12 serve as food storing compartments, respectively.

At the rear portion of the freezing compartment 11, a first evaporator 13 is mounted which carries out a heat exchange between air being blown into the freezing compartment 11 and the refrigerant passing through the first evaporator 13, thereby evaporating the refrigerant by latent heat from the air while cooling the air. A freezing compartment fan 15 is arranged above the evaporator 13. The freezing compartment fan 15 is driven by a first fan motor 14 to circulate the cold air heat-exchanged by the first evaporator 13 in the freezing compartment 11.

At the front of the first evaporator 13, a first duct member 16 is disposed which serves to guide a flow of cold air heat-exchanged by the first evaporator 13 such that it enters and circulates through the freezing compartment 11 by the rotating force of the freezing compartment fan 15. The freezing compartment 11 is provided with an air inlet port 16a through which the cold air guided by the first duct member 16 after being heat-exchanged by the first evaporator 13 is introduced in the freezing compartment 11.

A dewdrop dish 17 is disposed beneath the first evaporator 13. The dewdrop dish 17 collects dewdrops produced when the air being blown by the freezing compartment fan 15 is cooled by the heat exchange at the first evaporator 13 and subsequently drains the collected water through a drain hose 26 to an evaporating dish 36 disposed at the bottom of the refrigerator body 10. A thermistor 18 is mounted on the top surface of the freezing compartment 11 to sense the internal temperature Tf of the freezing compartment 11.

On the other hand, a second evaporator 20 is mounted at the rear portion of the refrigerating compartment 12. The second evaporator 20 carries out a heat exchange between air being blown into the refrigerating compartment 12 and the refrigerant passing through the second evaporator 20, thereby evaporating the refrigerant by latent heat from the air while cooling the air. Above the second evaporator 20, a refrigerating compartment fan 22 is arranged which is driven by a second fan motor 21 to circulate the cold air heat-exchanged by the second evaporator 20 in the refrigerating compartment 12.

At the front of the second evaporator 20, a second duct member 23 is disposed which serves to guide a flow of cold air heat-exchanged by the second evaporator 20 such that it enters and circulates through the refrigerating compartment 12 by the rotating force of the refrigerating compartment fan 22. The refrigerating compartment 12 is provided with an air inlet port 23a. Through the air inlet discharge port 23a, the cold air guided by the second duct member 23 after being heat-exchanged by the second evaporator 20 is introduced in the refrigerating compartment 12.

Another dewdrop dish 24 is disposed beneath the second evaporator 20. The dewdrop dish 24 collects dewdrops produced when the air being blown by the refrigerating compartment fan 22 is cooled by the heat exchange at the second evaporator 20 and subsequently drains the collected water through the drain hose 26 to the evaporating dish 36. Another thermistor 25 is mounted on the second duct member 23 to sense the internal temperature Tr of the refrigerating compartment 12.

A compressor 31 is mounted at the lower portion of the refrigerator body 10 to compress the gaseous refrigerant of low temperature and pressure, emerging from the first and second evaporators 13 and 20, to that of high temperature and pressure. A plurality of shelves 32 are disposed in both the freezing and refrigerating compartments 11 and 12 to partition the compartments into several food storing sections.

A main condenser 33 is arranged at the rear portion of the refrigerator body 10. Through the main condenser 33, the gaseous refrigerant of high temperature and pressure passes which has been compressed by the compressor 31. While passing through the main condenser 33, the gaseous refrigerant carries out a heat exchange with ambient air in accordance with the natural or forced convection phenomenon, so that it is forcedly cooled to a liquid phase under low temperature and high pressure. An assistant condenser 36 is arranged beneath the evaporating dish 36 to evaporate water collected in the evaporating dish 36.

Figure 5:
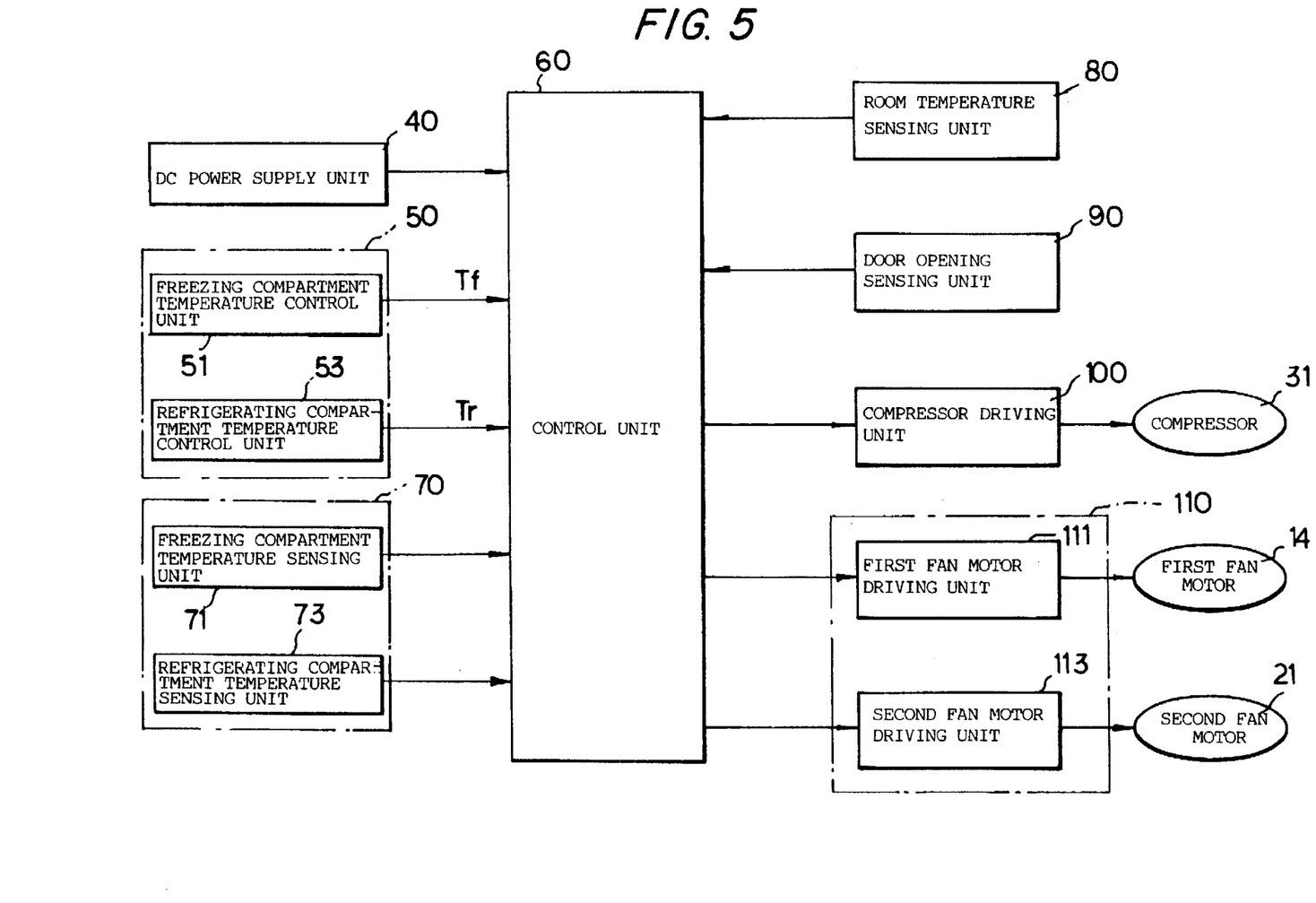
FIG. 5 is a block diagram illustrating a control device included in the refrigerator of FIG. 3 to control the operation of the refrigerator in accordance with the present invention.

FIG. 5 is a block diagram illustrating a control device included in the refrigerator having the above-mentioned arrangement to control the operation of the refrigerator in accordance with the present invention.

As shown in FIG. 5, the control device includes a DC power supply unit 40 for converting a source voltage from a commercial AC power source, input at an AC power input stage (not shown), into a DC voltage with a voltage level required to drive various units of the refrigerator.

A temperature control unit 50 is also provided as a key switch manipulated by a user to set the internal temperature of the refrigerator to a desired level. The temperature control unit 50 includes a freezing compartment temperature control unit 51 adapted to set the internal temperature Tf of the freezing compartment 11 to a desired level and a refrigerating compartment temperature control unit 52 adapted to set the internal temperature Tr of the refrigerating compartment 12 to a desired level.

The control device also includes a control unit 60 which is a microcomputer serving to initialize the refrigerator upon receiving the DC voltage from the DC power supply unit 40 and to control the overall operation of the refrigerator so as to maintain respective internal temperatures Tf and Tr of the freezing and refrigerating compartments 11 and 12 at their desired levels set by the temperature control unit 50.

In order to maintain the internal temperature of the refrigerator at the level set by the user through the temperature control unit 50, a temperature sensing unit 70 is also provided which senses the internal temperature of the refrigerator and sends it to the control unit 60. This temperature sensing unit 70 includes a freezing compartment temperature sensing unit 71 which comprises the thermistor 18 to sense the internal temperature Tf of the freezing compartment 11 and a refrigerating compartment temperature sensing unit 72 which comprises the thermistor 25 to sense the internal temperature Tr of the refrigerating compartment 12.

The control device further includes a room temperature sensing unit 80 for sensing the temperature of a place where the refrigerator is installed, that is, room temperature Ti. The room temperature sensing unit 80 comprises a thermistor mounted on the outer surface of the refrigerating compartment 12.

A door opening sensing unit 90 is also included in the control unit to sense whether or not the refrigerating compartment door 12a is opened. The door opening sensing unit 90 comprises a microswitch mounted on the inner surface of the refrigerating compartment door 12a. This door opening sensing unit 90 generates a high level signal in a door close state while generating a low level signal in a door open state. These signals are sent to the control unit 60.

In FIG. 5, the reference numeral 100 denotes a compressor driving unit which receives a control signal from the control unit 60 generated on the basis of a difference between the desired temperature set by the user through the temperature control unit 50 and the internal temperature sensed by the temperature sensing unit 70. In accordance with the control signal, the compressor driving unit 100 controls the compressor 31 to execute a cooling operation for the refrigerator.

In FIG. 5, the reference numeral 110 denotes a fan motor driving unit which serves to control the first and second fan motors 14 and 21 such that respective internal temperatures of the freezing and refrigerating compartments 11 and 12 are maintained at their desired levels set by the user through the temperature control unit 50. As shown in FIG. 5, the fan motor driving unit 110 includes a first fan motor driving unit 111 adapted to control the first fan motor 14, which circulates the cold air heat-exchanged by the first evaporator 13, under a control of the control unit 60 to maintain the internal temperature Tf of the freezing compartment 11 at its desired level set by the user, and a second fan motor driving unit 113 adapted to control the second fan motor 21, which circulates the cold air heat-exchanged by the second evaporator 20, under a control of the control unit 60 to maintain the internal temperature Tr of the refrigerating compartment 12 at its desired level set by the user.

Figure 6:
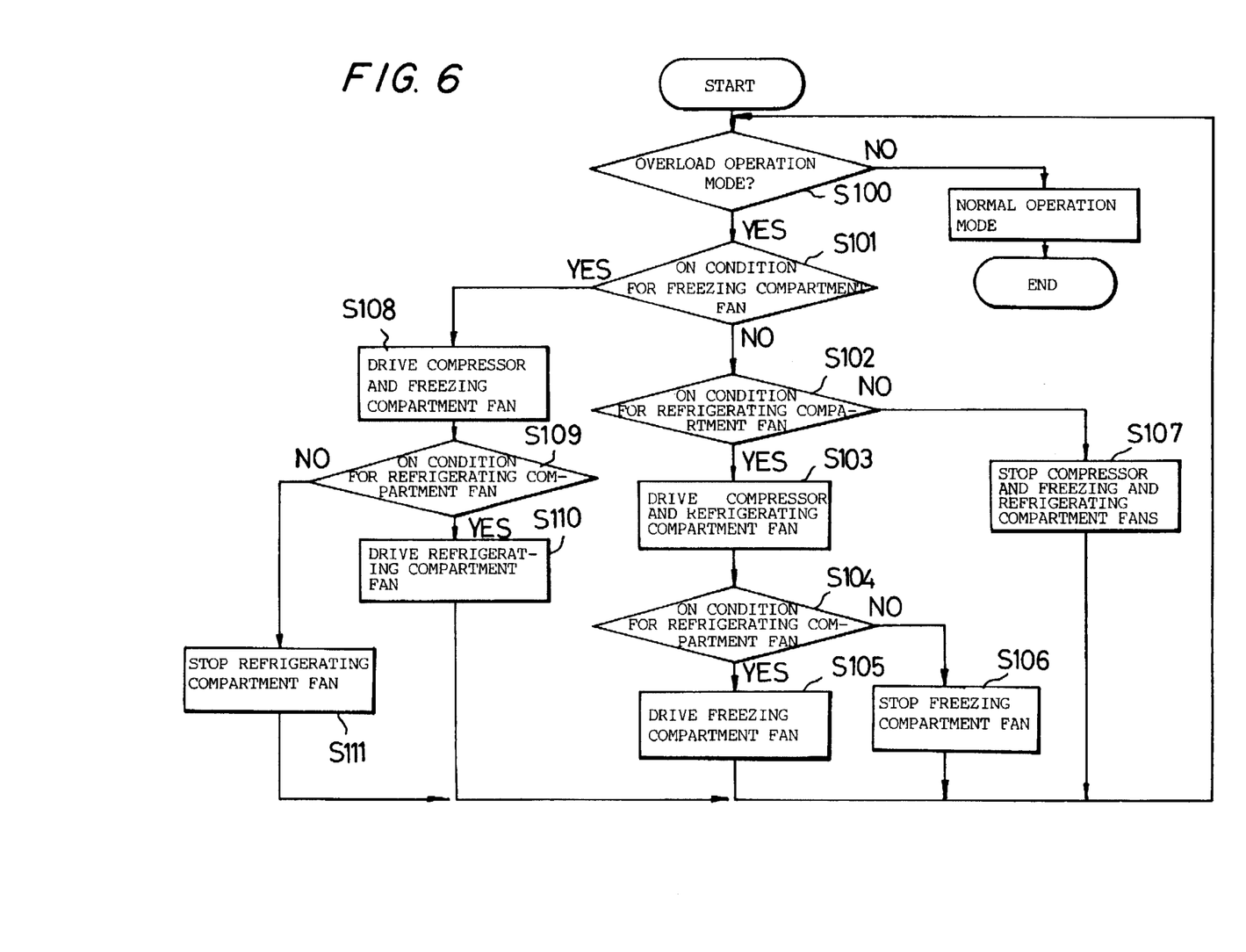
FIG. 6 is a flow chart illustrating the sequence of an overload control operation executed in the refrigerator of FIG. 3 in accordance with the present invention.
Figure 7:
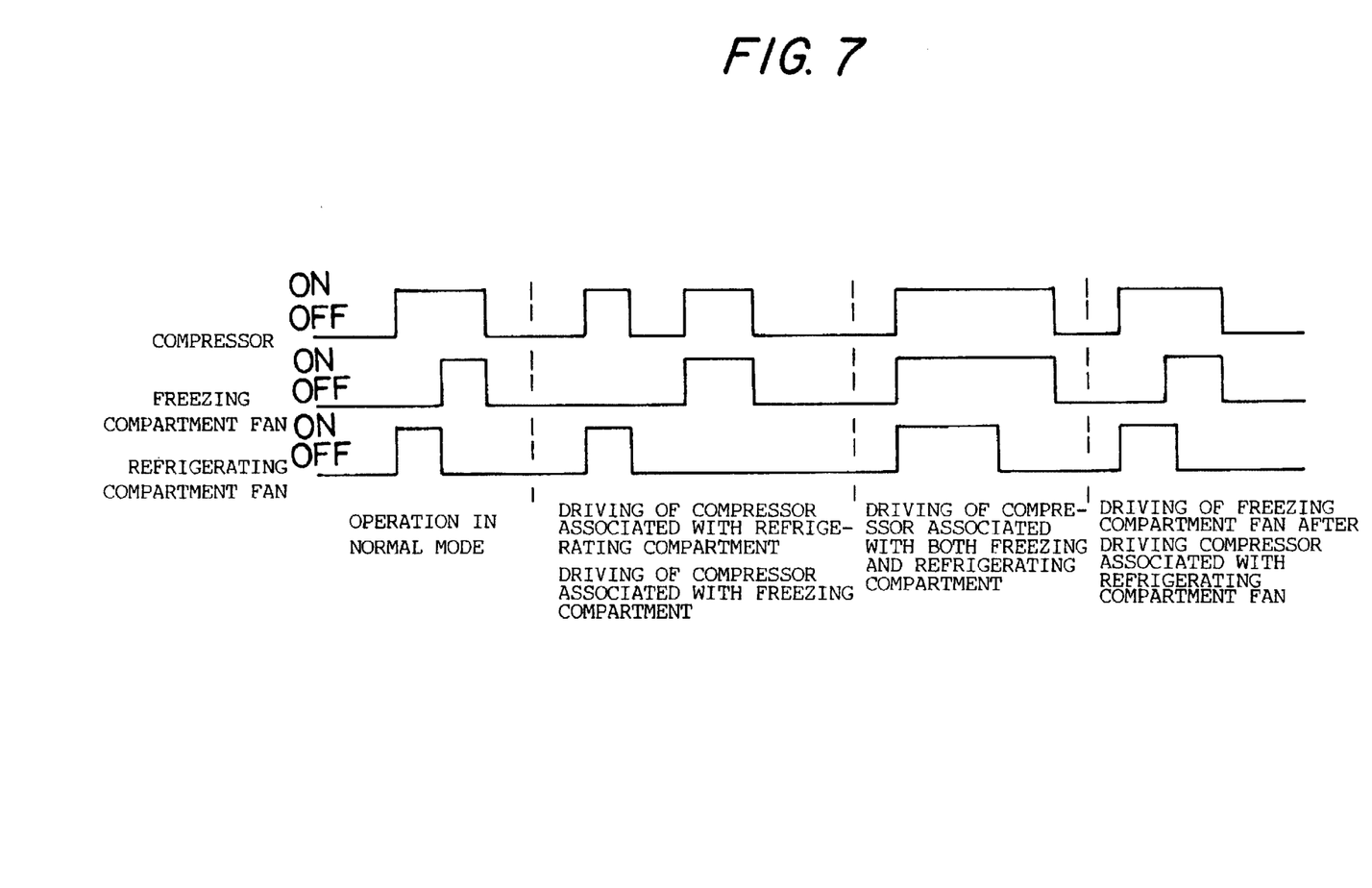
FIG. 7 is a timing chart illustrating the overload control operation executed in in the refrigerator of FIG. 3 in accordance with the present invention.

Now, the operation of the refrigerator in the overload mode controlled by the control device having the above-mentioned construction will be described in conjunction with FIGS. 6 and 7.

As will be explained in greater detail hereinafter, an overload condition of the refrigerator occurs (1) when the refrigerator is in a location where the ambient temperature is greater than a predetermined value, or (2) when the number of times per hour that the refrigerator door has been opened is at least equal to a predetermined number (the predetermined number being a function of the ambient temperature) or (3) when the period of time per hour that the refrigerator door is in an open condition is at least equal to a predetermined time period (the predetermined time period being a function of the ambient temperature).

When the refrigerator is determined at step S100 as being in the overload state requiring an overload mode operation (namely, YES), the compressor 31 is driven in accordance with a predetermined temperature for the refrigerating compartment 12, thereby maintaining the refrigerating compartment 12 at the predetermined temperature. In this case, the freezing and refrigerating compartment fans 15 and 22 are also driven to prevent the internal temperatures of the freezing and refrigerating compartments 11 and 12 from being increased.

In other words, where both the freezing and refrigerating compartment fans 15 and 22 are required to be in their ON state (ON-state condition), they are driven (namely, switched to their ON state) irrespective of weak cooling points of the freezing and refrigerating compartments 11 and 12. For example, when the temperature of a place where the refrigerator is installed, namely, the room temperature is not lower than 35° C., the refrigerator is determined as being in the overload state requiring the overload mode operation. Even if the room temperature is lower than 35° C., the refrigerator is determined as being in the overload state when the number of door opening times per hour is not less than 5 or when the total door open time is not less than 3 minutes. Then, the internal temperature of the refrigerating compartment 12 is detected and compared with a predetermined (reference) temperature (for example, at a medium cooling point of the refrigerating compartment, this predetermined temperature corresponds to 2° C. for turning off the refrigerating compartment fan and to 4° C. for turning on the refrigerating compartment fan). Where the internal temperature of the refrigerating compartment 12 is determined at step 102 as being higher than the predetermined temperature, namely, 4° C., the compressor 31 is driven irrespective of the internal temperature of the freezing compartment 11, thereby driving the refrigerating compartment fan 22 (step S103). When the freezing compartment fan 15 is required to be driven (namely, to be switched to its ON state) during the above temperature control operation for the refrigerating compartment 12 (step S104), it is also driven along with the refrigerating compartment fan 22 (step S105).

On the other hand, where the freezing compartment fan 15 is determined at step S101 as being required to be driven (if YES), it is driven along with the compressor 31 to control the internal temperature of the freezing compartment 11 (step S108). During this control operation, the ON-state condition of the refrigerating compartment fan 22 is determined (step S109). In accordance with the determined ON-state condition, the refrigerating compartment fan 22 is driven to control the internal temperature of the refrigerating compartment 22.

Figure 8A:
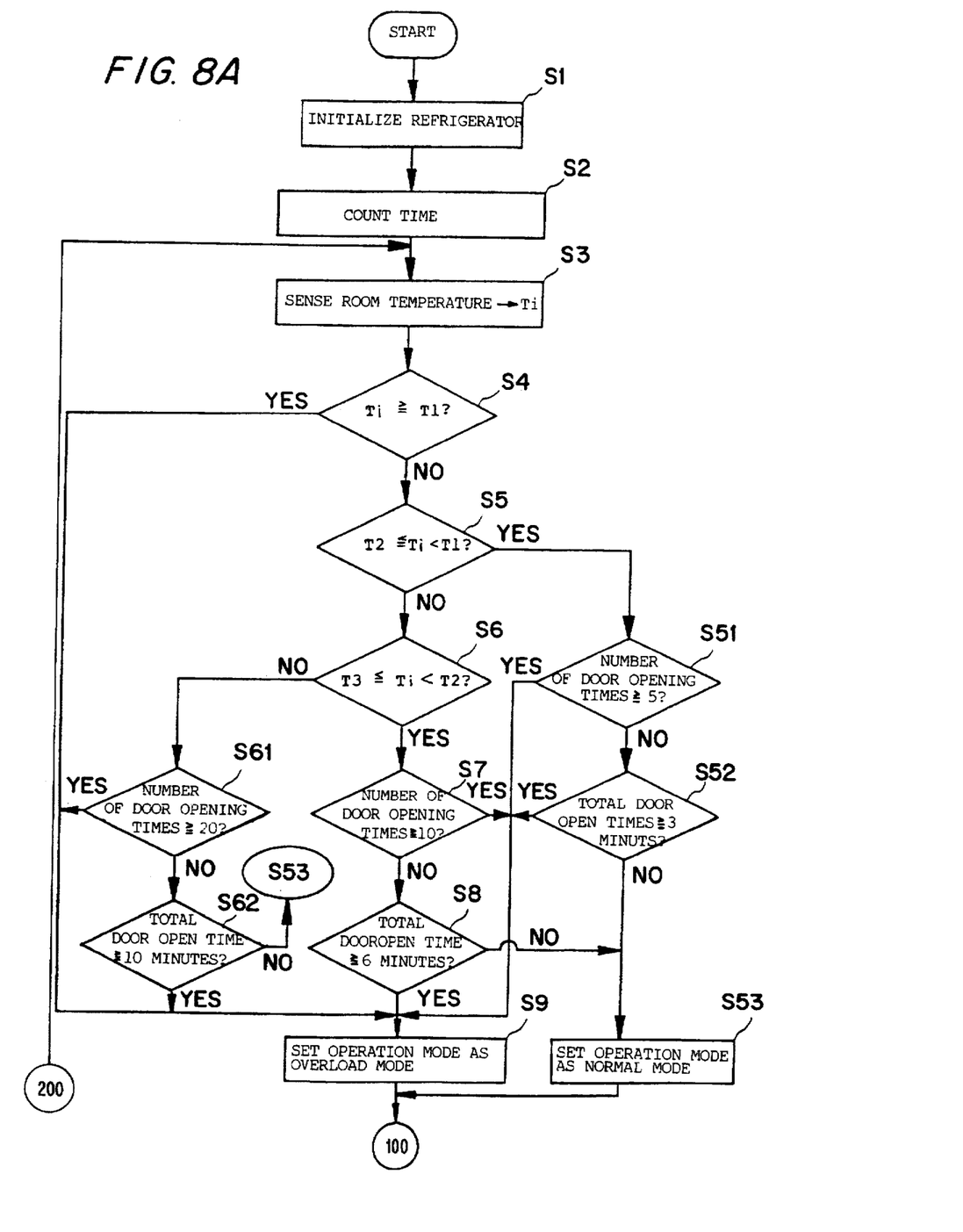
FIGS. 8A to 8C are flow charts respectively illustrating the sequence of a cooling control operation executed in the refrigerator of FIG. 3 in accordance with the present invention.
Figure 8B:
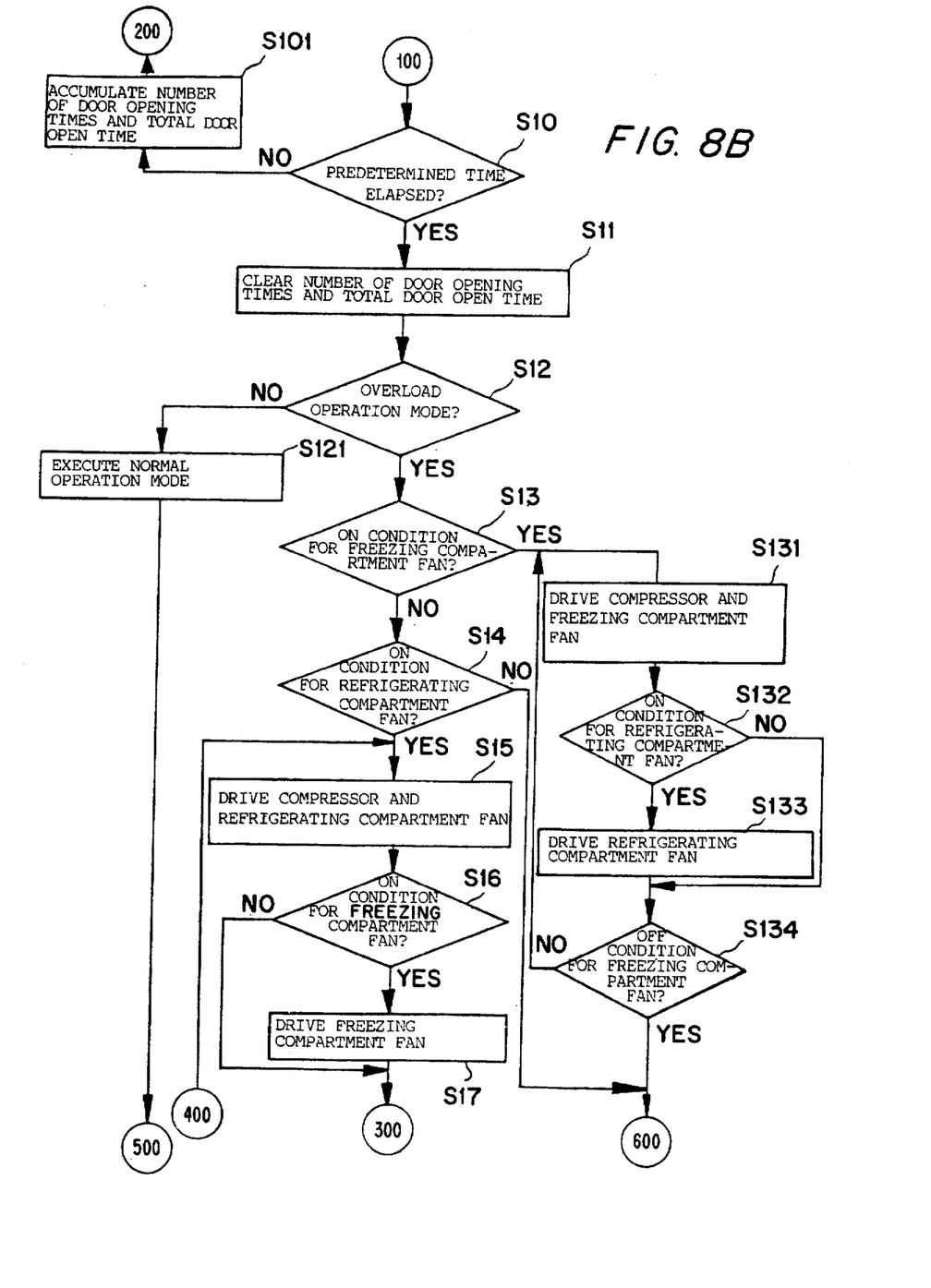
Figure 8C:
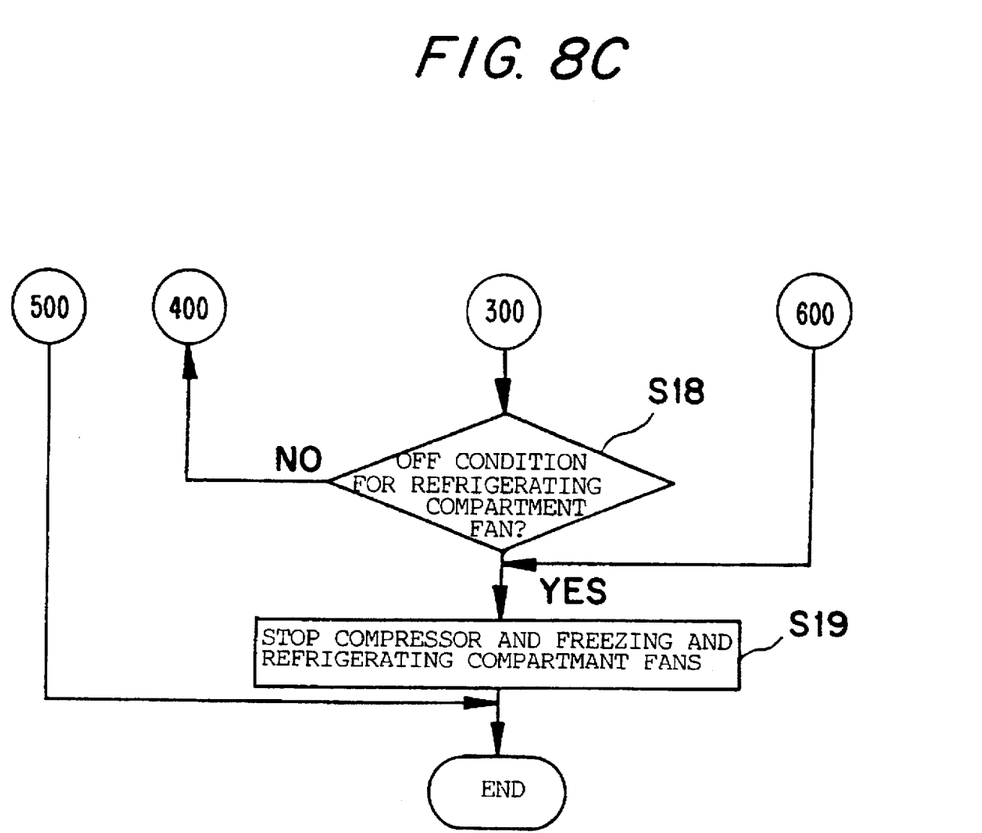

FIGS. 8A to 8C are flow charts respectively illustrating the sequence of a cooling control operation executed in the refrigerator having the above-mentioned arrangement in accordance with the present invention.

Once the refrigerator is powered, the DC power supply unit 40 converts a source voltage received from a commercial AC power source at the AC power input stage (not shown) into a DC voltage with a voltage level required to drive various units of the refrigerator. The DC voltage from the DC power supply unit 40 is then applied to the control unit 60 as well as various driving circuits.

At step SI, the control unit 60 initializes the refrigerator in response to the DC voltage received from the DC power supply unit 40. At step S2, the control unit 60 executes a time counting through a timer included therein to check an overload state of the refrigerator at one hour intervals.

Subsequently, the room temperature sensing unit 80 senses the room temperature Ti where the refrigerator is installed and sends the resulting signal indicative of the sensed room temperature to the control unit 60. These operations are executed at step S3. It is then determined at step S4 whether or not the room temperature Ti sensed by the room temperature sensing unit 80 is lower than a first predetermined temperature T1 previously set by the control unit 60. The first predetermined temperature T1 corresponds to a high room temperature of about 35° C. resulting in an overload state of the refrigerator, that is, a bad use condition of the refrigerator.

Where the room temperature Ti is determined at step S4 as being lower than the first predetermined temperature T1 (that is, if NO), the procedure proceeds to step S5. At step S5, it is determined whether or not the room temperature Ti sensed by the room temperature sensing unit 80 is lower than a second predetermined temperature T2 lower than the first predetermined temperature T1, that is, whether or not the room temperature Ti is within a first temperature range between the first and second predetermined temperatures T1 and T2. The second predetermined temperature T2 corresponds to 30° C. When the room temperature Ti is lower than the first temperature range (that is, if NO), the procedure proceeds to step S6. It is determined at step S6 whether or not the room temperature Ti is lower than a third predetermined temperature T3 lower than the second predetermined temperature T2, that is, whether or not the room temperature Ti is within a second temperature range between the second and third predetermined temperatures T2 and T3. The third predetermined temperature T3 corresponds to 20° C.

Where the room temperature Ti is determined at step S6 as being within the second temperature range (that is, if YES), the procedure proceeds to step S7. At step S7, the control unit 60 determines whether or not the number of times the door of the refrigerating compartment 12 has been opened is less than 10. The number of door opening times corresponds to the number of sensing signals from the door opening sensing unit 90 received to the control unit 60.

When the refrigerating compartment door 12a is opened, the door opening sensing unit 90 is turned off. In this case, the control unit 60 receives a low level signal from the door opening sensing unit 90. On the other hand, when the refrigerating compartment door 12a is closed, the door opening sensing unit 90 is turned on. In this case, the control unit 60 receives a high level signal from the door opening sensing unit 90. Based on these signals, the control unit 60 determines the number of times the refrigerating compartment door 12a has been opened.

Where the number of door opening times is determined at step S7 as being less than 10, the procedure proceeds to step S8 to determine whether or not the total door open time for the refrigerating compartment door 12a is less than 6 minutes.

If the total door open time is not less than 6 minutes (that is, if YES), it is then determined that the refrigerator is in an overload state. In this case, the procedure proceeds to step S9. At step S9, the control unit 60 sets the operation mode of the refrigerator as the overload operation mode.

At step S10, the control unit 60 counts the operation time of the refrigerator in the overload operation mode through the timer included therein and checks whether a predetermined time (namely, a unit time interval of about one hour for checking an overload condition of the refrigerator) has elapsed. When the predetermined time has not yet elapsed (that is, if NO), the procedure proceeds to step S101 to increment the number of door opening times by one and to accumulate the current door open time to the total door open time. Thereafter, the above procedure following step S3 is repeatedly executed to determine the overload condition of the refrigerator.

Where it is determined at step S10 that the predetermined time has elapsed (that is, if YES), the number of door opening times and the total door open time are cleared at step S11 to check the overload condition of the refrigerator from the start again because the unit time interval for the overload checking has elapsed.

Thereafter, it is determined at step S12 whether the operation mode set by the control unit 60 corresponds to the overload operation mode. When the set operation mode is determined as corresponding to the overload operation mode (that is, if YES), a determination is made about required operation conditions respectively associated with the freezing and refrigerating compartments 11 and 12 in an overload state of the refrigerator. That is, it is determined at step S13 whether the freezing compartment fan 15 is required to be in its ON state.

The ON-state condition of the freezing compartment fan 15 corresponds to an operation condition for driving the freezing compartment fan 15 to cool the freezing compartment 11 when the internal temperature Tf of freezing compartment 11 sensed by the freezing compartment temperature sensing unit 71 is higher than a desired freezing compartment temperature set by the user through the freezing compartment temperature control unit 51.

When the freezing compartment fan 15 is not determined at step S13 as being required to be in its ON state (that is, if NO), the procedure proceeds to step S14 to determine whether the refrigerating compartment fan 22 is required to be in its ON state.

The ON-state condition of the refrigerating compartment fan 22 corresponds to an operation condition for driving the refrigerating compartment fan 22 to cool the refrigerating compartment 12 when the internal temperature Tr of refrigerating compartment 12 sensed by the refrigerating compartment temperature sensing unit 73 is higher than a desired refrigerating compartment temperature set by the user through the refrigerating compartment temperature control unit 53.

When the refrigerating compartment fan 22 is determined at step S14 as being required to be in its ON state (that is, if YES), the control unit 60 sends, at step S15, a control signal for cooling the refrigerating compartment 12 to both the compressor driving unit 100 and the second fan motor driving unit 113 because the internal temperature Tr of refrigerating compartment 12 is higher than the desired refrigerating compartment temperature set by the user.

Based on the control signal, the compressor driving unit 100 and second fan motor driving unit 113 drive the compressor 31 and second fan motor 21, respectively. Accordingly, the refrigerating compartment fan 22 coupled to the second fan motor 21 is rotated. Out of the compressor 31, refrigerant compressed to a gaseous phase of high temperature and pressure is discharged toward the assistant condenser 35.

Figure 4:
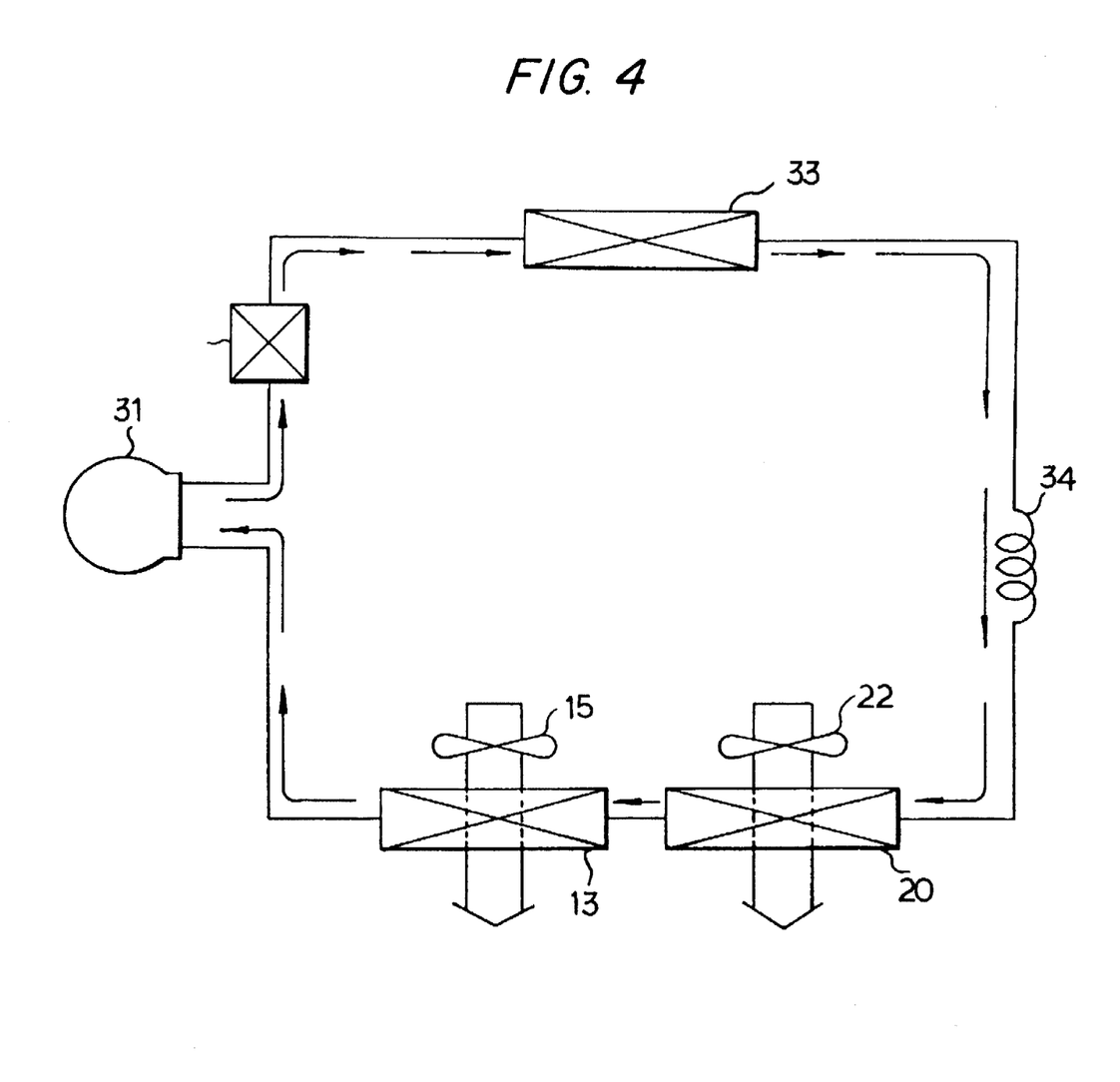
FIG. 4 is a circuit diagram illustrating a refrigerating cycle according to the present invention.

While passing through the assistant condenser 35, the refrigerant serves to evaporate water contained in the evaporating dish 36. The refrigerant is then introduced in the main condenser 33. While passing through the main condenser 33, the refrigerant carries out a heat exchange with ambient air in accordance with the natural or forced convection, so that it is cooled to have a liquid phase under low temperature and high pressure. That is, the refrigerant is liquefied.

The liquid-phase refrigerant of low temperature and high pressure, which has been liquefied in the main condenser tube 33, then passes through the capillary tube 34. By the capillary tube 34, the refrigerant is changed to a fog phase under low temperature and pressure. The refrigerant emerging from the capillary tube 34 is then introduced in the first and second evaporators 13 and 20.

While passing through the first and second evaporators 13 and 20 which is constituted by a plurality of pipes, the fog-phase refrigerant of low temperature and pressure carries out a heat exchange with air being blown into the freezing and refrigerating compartments 11 and 12. By this heat exchange, the refrigerant is vaporized while cooling the air. The resultant gaseous refrigerant flows of low temperature and pressure respectively emerging from the first and second evaporators 13 and 20 are then introduced in the compressor 31. Thus, the refrigerant circulates the refrigerating cycle of FIG. 4 repeatedly.

In the above case associated with step S15, however, there is no flow of air being blown toward the freezing compartment 11 because the freezing compartment fan 15 is not driven. Accordingly, no heat exchange is carried out at the first evaporator 13. The heat exchange is carried out only at the second evaporator 20.

The cold air heat-exchanged with the refrigerant by the second evaporator 20 is blown by the rotating force of the refrigerating compartment fan 22 and guided by the second duct member 23 so that it is discharged into the refrigerating compartment 12 through the cold air inlet port 23. As a result, the refrigerating compartment 12 is cooled.

At this time, it is determined at step S16 whether the freezing compartment fan 15 is required to be in its ON state. When the freezing compartment fan 15 is required to be in its ON state (that is, if YES), the control unit 60 sends, at step S17, a control signal for cooling the freezing compartment 11 to the first fan motor driving unit 111 because the internal temperature Tf of freezing compartment 11 is higher than the desired freezing compartment temperature set by the user.

Based on the control signal, the first fan motor driving unit 111 drive the first fan motor 14, thereby rotating the freezing compartment fan 15 coupled to the first fan motor 14. In this case, it is noted that the compressor 31 and refrigerating compartment fan 22 are still being driven. Accordingly, air is blown toward both the freezing and refrigerating compartments 11 and 12 while passing the first and second evaporators 13 and 20. In other words, heat exchange is carried out at both the first and second evaporators 13 and 20. In this case, it is also noted that the refrigerant circulates the refrigerating cycle of FIG. 4 repeatedly.

The cold air heat-exchanged with the refrigerant by the first evaporator 13 is blown by the rotating force of the freezing compartment fan 15 and guided by the first duct member 16 so that it is discharged into the freezing compartment 11 through the cold air inlet port 16a. As a result, the freezing compartment 11 is cooled.

Subsequently, it is determined at step S18 whether the refrigerating compartment fan 22 is required to be in its OFF state.

The OFF condition of the refrigerating compartment fan 22 corresponds to an operation condition for stopping the cooling operation for the refrigerating compartment 12 when the internal temperature Tr of refrigerating compartment 12 sensed by the refrigerating compartment temperature sensing unit 73 is lower than the desired refrigerating compartment temperature set by the user through the refrigerating compartment temperature control unit 53.

When the refrigerating compartment fan 22 is not determined at step S18 as being required to be in its OFF state (that is, if NO), step S15 and steps following step S15 are repeatedly executed to continuously cool the refrigerating compartment 12 because the internal temperature Tr of refrigerating compartment 12 is still higher than the desired refrigerating compartment temperature set by the user.

On the other hand, where the refrigerating compartment fan 22 is determined at step S18 as being required to be in its OFF state (that is, if YES), the control unit 60 sends, at step S19, a control signal for stopping the cooling operation for the refrigerating compartment 12 to the compressor driving unit 100 and the first and second fan motor driving units and 113 because the internal temperature Tr of refrigerating compartment 12 is lower than the desired refrigerating compartment temperature set by the user.

Based on the control signal, the compressor driving unit 100 and the first and second fan motor driving units 111 and 113 stop the compressor 31 and the first and second fan motors 14 and 21, respectively. Accordingly, the freezing and refrigerating compartment fans 15 and 22 are stopped, thereby completing the cooling operation for the freezing and refrigerating compartments 11 and 12. Thus, the overall procedure is completed.

Returning now to step S4, if the room temperature Ti is not determined at step S4 as being lower than the first predetermined temperature T1 (that is, if YES), the current condition of the refrigerator is determined as being in an overload condition, namely, a bad condition. In this case, the control unit 60 sets the operation mode of the refrigerator as the overload operation mode at step S9. The procedure following step S9 is then executed.

When the room temperature Ti is determined at step S5 as being within the first temperature range between T1 and T2 (that is, if YES), the procedure proceeds to step S51. At step S51, the control unit 60 determines whether or not the number of times the door of the refrigerating compartment 12 has been opened is less than 5. Where the number of door opening times is determined as being not less than 5 (that is, if YES), the control unit 60 determines that the refrigerator is in an overload state because the refrigerating compartment 12 has been opened at least 5 times under a condition that the room temperature Ti ranges from 30° C. to 35° C. In this case, step S9 and steps following step S9 are executed.

When the number of door opening times is determined at step S51 as being less than 5 (that is, if NO), it is determined at step S52 whether or not the total door open time is less than 3 minutes. Where the total door open time is not less than 3 minutes (that is, if YES), the control unit 60 determines that the refrigerator is in an overload state because the refrigerating compartment 12 has been opened for at least 3 minutes under a condition that the room temperature Ti ranges from 30° C. to 35° C. In this case, step S9 and steps following step S9 are executed.

If the total door open time is determined at step S52 as being less than 3 minutes (that is, if NO), the control unit 60 then determines that the refrigerator is in a normal state because the refrigerating compartment 12 is in neither state of being opened at least five times under a condition that the room temperature Ti ranges from 30° C. to 35° C. nor of being opened for at least 3 minutes. In this case, the procedure proceeds to step S53. At step S53, the control unit 60 sets the operation mode of the refrigerator as a normal operation mode and repeatedly executes step S10 and steps following step S10.

Meanwhile, when the room temperature Ti is determined at step S6 as being beyond the second temperature range between T2 and T3 (that is, if NO), the procedure proceeds to step S61. At step S61, the control unit 60 determines whether or not the number of times the door of the refrigerating compartment 12 has been opened is less than 20. When the number of door opening times is not less than 20 (that is, if YES), the control unit 60 determines that the refrigerator is in an overload state because the refrigerating compartment 12 has been opened at least 20 times under a condition that the room temperature Ti is not more than 20° C. In this case, step S9 and steps following step S9 are executed.

Where the number of door opening times is determined at step S61 as being less than 20, the procedure proceeds to step S62. It is determined at step S62 whether or not the total door open time for the refrigerating compartment 12 is less than 10 minutes. If the total door open time is not less than 10 minutes (that is, if YES), the control unit 60 then determines that the refrigerator is in an overload state because the refrigerating compartment 12 has been opened for at least 10 minutes under a condition that the room temperature Ti is not more than 20° C. In this case, step S9 and steps following step S9 are executed.

When the total door open time is determined at step S62 as being less than 10 minutes, the control unit 60 determines that the refrigerator is in a normal state because the refrigerating compartment 12 is neither in a state of being opened at least 20 times under a condition that the room temperature Ti is not more than 20° C. nor in a state of being opened for at least 10 minutes. In this case, the procedure proceeds to step S53 for setting the operation mode of the refrigerator as the normal operation mode and executing step S53 and steps following step S53.

On the other hand, where the number of door opening times is determined at step S7 as being not less than 10 (that is, if YES), the control unit 60 determines that the refrigerator is in an overload state because the refrigerating compartment 12 has been opened at least 10 times under a condition that the room temperature Ti ranges from 20° C. to 30° C. In this case, step S9 and steps following step S9 are executed.

When the total door open time is determined at step S8 as being less than 6 minutes (that is, if NO), the control unit 60 then determines that the refrigerator is in a normal state because the refrigerating compartment 12 is neither in a state of being opened at least 10 times under a condition that the room temperature Ti ranges from 20° C. to 30° C. nor in a state of being opened for at least 6 minutes. In this case, the procedure proceeds to step S53. At step S53, the control unit 60 sets the operation mode of the refrigerator as the normal operation mode and executes steps following step S10.

Where the operation mode is not determined at step S12 as being the overload operation mode (that is, if NO), the procedure proceeds to step S121. At step S121, a control operation for the normal operation mode is executed to control the internal temperatures Tf and Tr of freezing and refrigerating compartments 11 and 12 such that they are maintained at desired levels respectively set by the user through the freezing compartment temperature control unit 51 and refrigerating compartment temperature control unit 53. After completing this control operation, the overall procedure is completed.

On the other hand, when the freezing compartment fan 15 is determined at step S13 as being required to be in its ON state (that is, if YES), the control unit 60 sends, at step S131, the control signal for cooling the freezing compartment 11 to both the compressor driving unit 100 and the first fan motor driving unit 111 because the internal temperature Tf of freezing compartment 11 is higher than the desired freezing compartment temperature set by the user.

Based on the control signal, the compressor driving unit 100 and first fan motor driving unit 111 drive the compressor 31 and first fan motor 14, respectively. Accordingly, the freezing compartment fan 15 coupled to the first fan motor 14 is rotated. From the compressor 31, refrigerant compressed to a gaseous phase of high temperature and pressure is discharged toward the assistant condenser 35.

While passing through the assistant condenser 35, the refrigerant serves to evaporate water contained in the evaporating dish 36. The refrigerant is then introduced in the main condenser 33. While passing through the main condenser 33, the refrigerant carries out a heat exchange with ambient air in accordance with the natural or forced convection, so that it is cooled to have a liquid phase under low temperature and high pressure. That is, the refrigerant is liquified.

The liquid-phase refrigerant of low temperature and high pressure, which has been liquified in the main condenser tube 33, then passes through the capillary tube 34. In the capillary tube 34, the refrigerant is changed to a fog phase under low temperature and pressure. The refrigerant emerging from the capillary tube 34 is then introduced in the first and second evaporators 13 and 20.

While passing through the first and second evaporators 13 and 20, the fog-phase refrigerant of low temperature and pressure carries out a heat exchange with air being blown into the freezing and refrigerating compartments 11 and 12. By this heat exchange, the refrigerant is vaporized while cooling the air. The resultant gaseous refrigerant flows of low temperature and pressure respectively emerging from the first and second evaporators 13 and 20 are then introduced in the compressor 31. Thus, the refrigerant circulates the refrigerating cycle of FIG. 4 repeatedly.

In the above case associated with step S131, however, there is no flow of air being blown toward the refrigerating compartment 12 because the refrigerating compartment fan 22 is not driven. Accordingly, no heat exchange is carried out at the second evaporator 20. The heat exchange is carried out only at the first evaporator 13.

The cold air heat-exchanged with the refrigerant by the first evaporator 13 is blown by the rotating force of the freezing compartment fan 15 and guided by the first duct member 16 so that it is discharged into the freezing compartment 11 through the cold air discharge port 16a. As a result, the freezing compartment 11 is cooled.

At this time, it is determined at step S132 whether the refrigerating compartment fan 22 is required to be in its ON state. When the refrigerating compartment fan 22 is required to be in its ON state (that is, if YES), the control unit 60 sends, at step S133, a control signal for cooling the refrigerating compartment 12 to the second fan motor driving unit 113 because the internal temperature Tr of refrigerating compartment 12 is higher than the desired refrigerating compartment temperature set by the user.

Based on the control signal, the second fan motor driving unit 113 drives the second fan motor 21, thereby rotating the refrigerating compartment fan 22 coupled to the second fan motor 21. In this case, it is noted that the compressor 31 and freezing compartment fan 15 are being still driven. Accordingly, air is blown toward both the freezing and refrigerating compartments 11 and 12 while passing through the first and second evaporators 13 and 20. In other words, heat exchange is carried out at both the first and second evaporators 13 and 20. In this case, it is also noted that the refrigerant circulates the refrigerating cycle of FIG. 4 repeatedly.

The cold air heat-exchanged with the refrigerant by the second evaporator 20 is blown by the rotating force of the refrigerating compartment fan 22 and guided by the second duct member 23 so that it is discharged into the refrigerating compartment 12 through the cold air discharge inlet port 23a. As a result, the refrigerating compartment 12 is cooled.

Subsequently, it is determined at step S134 whether the freezing compartment fan 15 is required to be in its OFF state.

The OFF condition of the freezing compartment fan 15 corresponds an operation condition for stopping the cooling operation for the freezing compartment 11 when the internal temperature Tf of freezing compartment 11 sensed by the freezing compartment temperature sensing unit 71 is lower than the desired freezing compartment temperature set by the user through the freezing compartment temperature control unit 51.

When the freezing compartment fan 15 is not determined at step S134 as being required to be in its OFF state (that is, if NO), step S131 and steps following step S131 are executed to continuously cool the freezing compartment 11 because the internal temperature Tf of freezing compartment 11 is still higher than the desired freezing compartment temperature set by the user.

If the freezing compartment fan 15 is determined at step S134 as being required to be in its OFF state (that is, if YES), then the control unit 60 executes step S19 and steps following step S19 to stop the cooling operation for the freezing compartment because the internal temperature Tf of freezing compartment 11 is lower than the desired temperature set by the user.

On the other if, the refrigerating compartment fan 22 is not determined at step S14 as being required to be in its ON state (that is, if NO), the control unit 60 sends, at step S19, a control signal for stopping the cooling operation for the freezing and refrigerating compartments 11 and 12 to the compressor driving unit 100 and the first and second fan motor driving units 111 and 113 because the internal temperature Tr of refrigerating compartment 12 is lower than the desired refrigerating compartment temperature set by the user.

Based on the control signal, the compressor driving unit 100 and the first and second fan motor driving units 111 and 113 stop the compressor 31 and the first and second fan motors 14 and 21, respectively. Accordingly, the freezing and refrigerating compartment fans 15 and 22 are stopped, thereby completing the cooling operation for the freezing and refrigerating compartments 11 and 12. Thus, the overall procedure is completed.

Is apparent from the above description, the present invention provides an apparatus for and a method of controlling a refrigerator, being capable of constantly maintaining respective internal temperatures of freezing and refrigerating compartments by determining respective operation conditions of the freezing and refrigerating compartments and driving the compressor and fan on the basis of the internal temperatures of the freezing and refrigerating compartments when the refrigerator is in an overload state. Accordingly, it is possible to not only prevent foods stored in the refrigerating compartment from being spoiled, but also to satisfy the consumer's demand.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a refrigerator having separate freezing and refrigerating compartments, a compressor, a freezing compartment fan, and a refrigerating compartment fan, comprising the steps of:

A. sensing an ambient temperature of a room in which the refrigerator is disposed, and generating a first signal representative thereof;
   B. counting a number of times a door of the refrigerator has been opened per unit time, and generating a second signal representative thereof;
   C. counting a total time period in which the door is in an open state per unit time, and generating a third signal representative thereof;
   D. comparing said first, second, and third signals with respective reference signals and determining whether the refrigerator is in an overload state or a normal state as a function of such comparison;
   E. sensing respective temperatures in the freezing and refrigerating compartments;
   F. operating the refrigerator in a normal mode when the normal state is determined in step D, by actuating the compressor, the freezing compartment fan, and the refrigerating compartment fan when the temperature in the freezing compartment is above a reference freezing temperature; and
   G. operating the refrigerator in an overload mode when the overload state is determined in step D, by actuating the compressor and the freezing compartment fan in accordance with a relationship between the temperature in the freezing compartment and a reference freezing temperature, and actuating the compressor and the refrigerating compartment fan in accordance with a relationship between the temperature in the refrigerating compartment and a reference refrigerating temperature.

2. The method according to claim 1 wherein step G includes operating the compressor and the refrigerating compartment fan to cool the refrigerating compartment when the temperature in the refrigerating compartment is not less than a reference refrigerating temperature.

3. The method according to claim 2 wherein step G includes operating the compressor and the freezing compartment fan to cool the freezing compartment when the temperature in the freezing compartment is not less than a reference freezing temperature.

4. The method according to claim 1 wherein step G includes operating the refrigerator in an overload mode when the overload state is determined in step D, by actuating the compressor and the freezing compartment fan in accordance with a relationship between the temperature in a freezing compartment and a reference freezing temperature, and actuating the compressor and the refrigerating compartment fan in accordance with a relationship between the temperature in the refrigerating compartment and a reference refrigerating temperature.

5. A refrigerator, comprising
   a compressor;
   a freezing compartment;
   a first evaporator connected to the compressor;
   a freezing compartment fan for producing a first flow of cold air from the first evaporator to the freezing compartment;
   a refrigerating compartment;
   a second evaporator connected to the compressor;
   a refrigerating compartment fan for producing a second flow of cold air from the second evaporator to the refrigerating compartment;
   a first temperature sensor for sensing a temperature in the freezing compartment;
   a second temperature sensor for sensing a temperature in the refrigerating compartment; and
   a control mechanism for determining whether the refrigerator is in a normal state or an overload state, and for actuating the compressor and the refrigerating compartment fan in accordance with a relationship between the temperature in the refrigerating compartment and a reference refrigerating temperature when the refrigerator is determined to be in an overload state.

6. The refrigerator according to claim 5 wherein the control mechanism is further operable to actuate the compressor and the freezing compartment fan in accordance with a relationship between the temperature in the freezing compartment and a reference freezing temperature when the refrigerator is determined to be in an overload state.

7. The refrigerator according to claim 6 wherein the control means is operable to drive the compressor, the freezing compartment fan, and the refrigerating compartment fan in accordance with a relationship between the temperature in the freezing compartment and a reference freezing temperature when the refrigerator is determined to be in a normal state.

* * * * *